H. E. MARCHAND.
Automatic Apparatus for Measuring Liquids.
No. 221,333.  Patented Nov. 4, 1879.
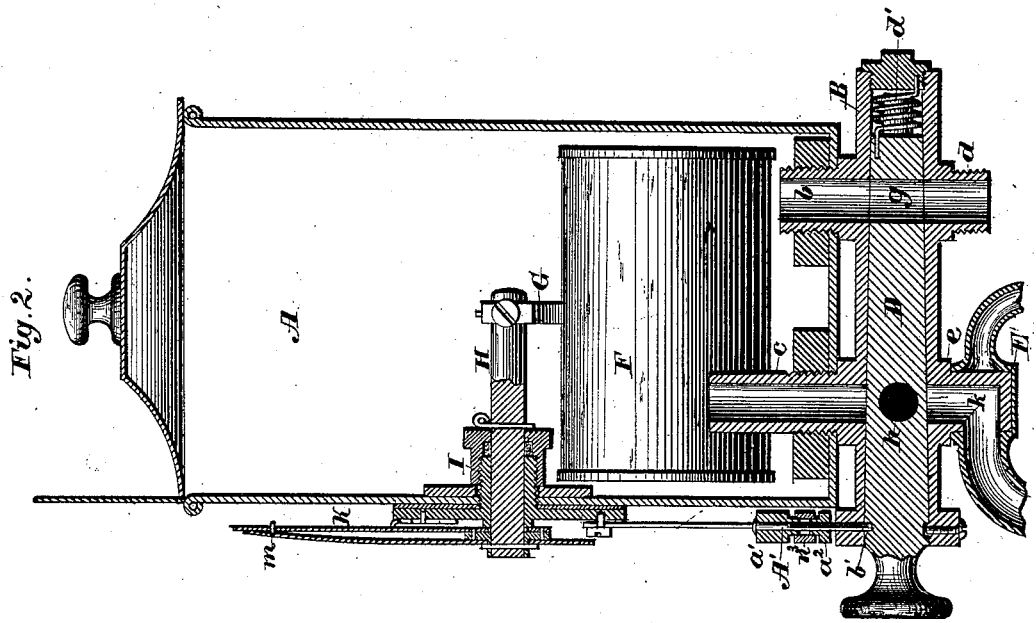
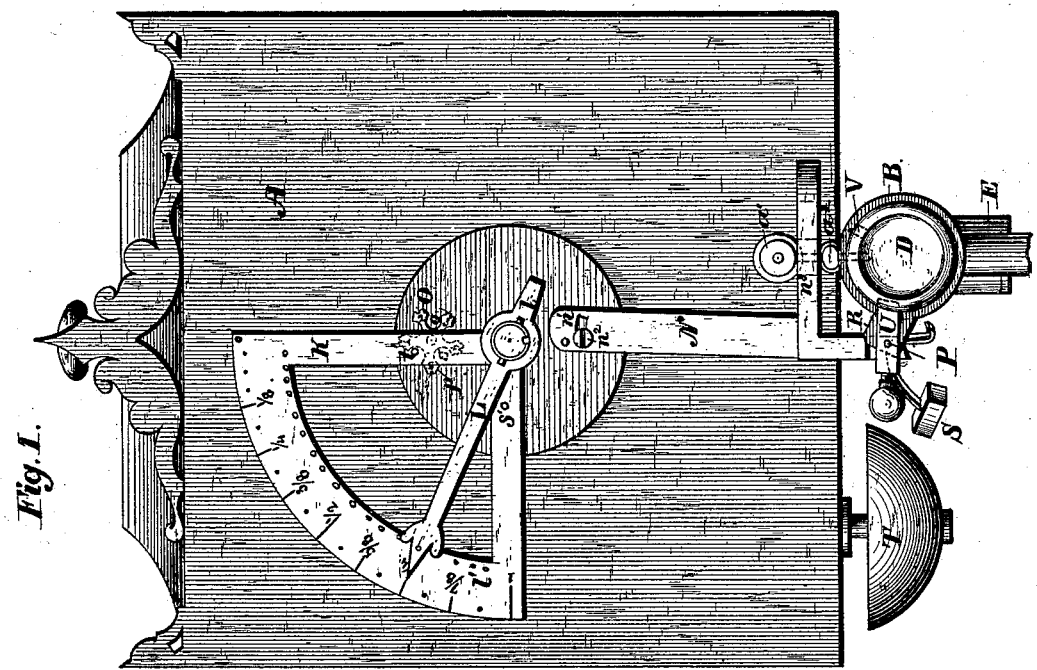
Attest:
J. Henry Kaiser
James M. Wright
Inventor:
Henry E. Marchand
By James L. Norris.
Atty.

2 Sheets—Sheet 2.
H. E. MARCHAND.
Automatic Apparatus for Measuring Liquids.
No. 221,333. Patented Nov. 4, 1879.
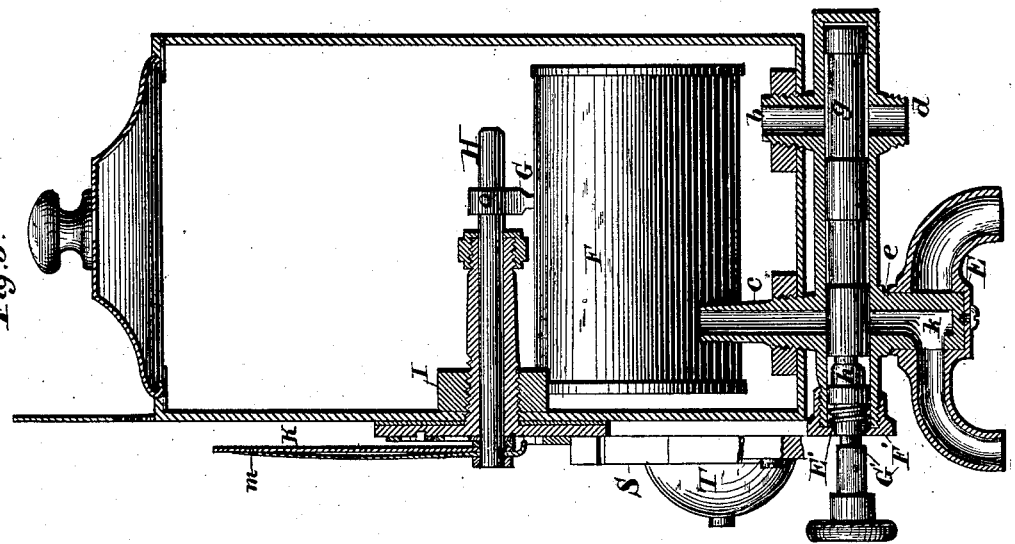
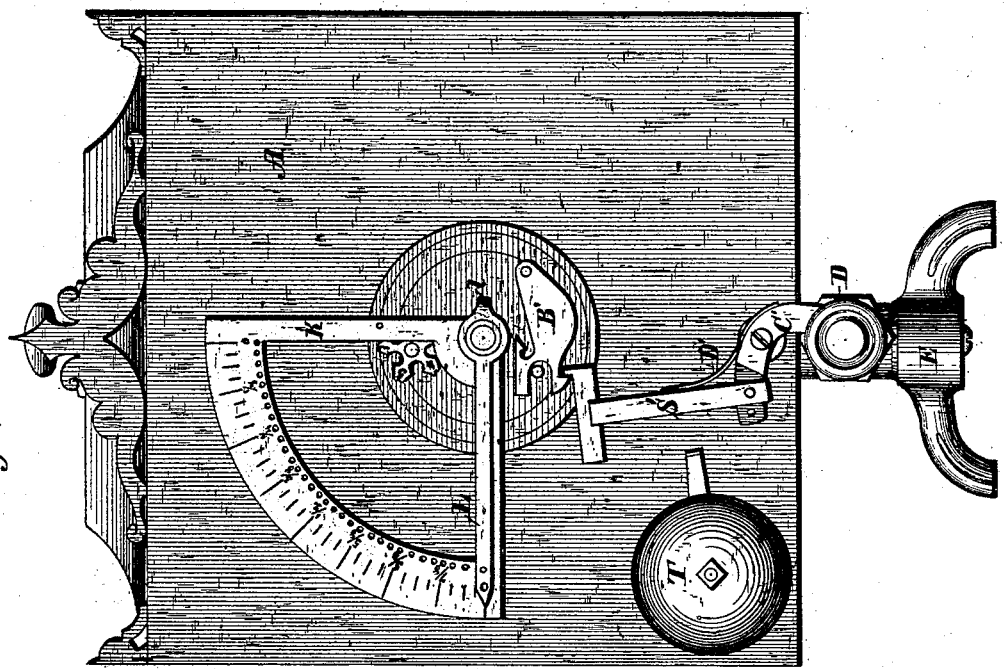
Attest
J. Henry Kaiser
James M. Wright
Inventor:
Henry E. Marchand
By James L. Norris.
Atty.
N. PETERS, PHOTO-LITHOGRAPHER, WASHINGTON, D. C.

UNITED STATES PATENT OFFICE.

HENRY E. MARCHAND, OF PITTSBURG, PENNSYLVANIA.

IMPROVEMENT IN AUTOMATIC APPARATUS FOR MEASURING LIQUIDS.

Specification forming part of Letters Patent No. 221,333, dated November 4, 1879; application filed September 4, 1879.

*To all whom it may concern:*

Be it known that I, HENRY E. MARCHAND, of Pittsburg, in the county of Allegheny and State of Pennsylvania, have invented certain new and useful Improvements in Automatic Apparatus for Measuring Liquids, of which the following is a specification.

This invention has for its object to provide an apparatus for measuring liquids, into which the liquid may be conducted from a suitable supply, and which will be automatically operated through the medium of suitable mechanism by means of the inflowing fluid when it has accumulated in proper quantity to stop the inflow of the oil, discharge the oil collected, and register and indicate the quantity passing through the apparatus, whereby all necessity of handling the liquid is obviated in measuring and transferring it from one vessel or receptacle to another, which is inconvenient in all cases, and extremely disagreeable in the case of oils and other liquids liable to soil or injure the hands or clothing.

The invention consists, first, in the combination, with a measuring-chamber, of a substantially cylindrical valve-casing, connected with said chamber by an inlet and outlet passage, and provided with additional supply and discharge ports, a valve or plug fitting within said casing, and having transverse passages at angles to each other, which are adapted to alternately connect the inlet of the measuring-chamber with the supply-port of the valve-casing, and the outlet of said chamber with the discharge-port of said casing, a float arranged within the measuring-chamber, and connected with a rock-shaft projecting outwardly through the wall thereof, and a lever connecting the outer end of said rock-shaft with the valve or plug, whereby, when the measuring-chamber becomes properly filled, the float will rise, and the valve or plug will be automatically operated to close the inlet and open the outlet, and the discharge-port of the valve-casing, and, as the chamber becomes emptied, said float will fall, and the position of the valve will be automatically reversed; second, in the combination with the float by which the valve is operated through intermediate mechanism, of a sector secured rigidly to the shaft, which said float operates, and an adjustable index or pointer secured loosely to said shaft, and adapted to be adjusted with respect to the sector in such manner that the projection on the pointer may be caused to trip the lever sooner or later, as desired, whereby the quantity of liquid to be measured may be varied, as more fully hereinafter specified; third, in the combination, with the float, sector, and lever for operating the valve to change its ports, the alarm and mechanism operated by the mechanism for shifting the valve to sound the alarm and indicate when the ports of the valve are changed, as more fully hereinafter set forth; fourth, in the combination with the sector, secured to the shaft to which the float is attached, of a rotating dial having curved arms with which two pins are adapted to engage, one of said pins striking the lower curved arm on the forward movement of the sector, and the upper arm on the backward movement of the sector, whereby said dial is moved the extent of one arm at each two movements of the sector to record the quantities of liquid successively measured, as more fully hereinafter set forth; fifth, in the combination, with the sector, and the shaft to which the float is attached, of a pointer or index adapted to be adjusted relatively to the float, whereby the lever may be tripped at any desired point to vary the quantity of liquid measured, as more fully hereinafter specified.

In the drawings, Figure 1 represents a front elevation of my improved apparatus. Fig. 2 represents a vertical sectional view of the same. Fig. 3 represents a front elevation of a modification of the apparatus, and Fig. 4 a sectional view of said modification.

The letter A indicates a measuring chamber or vessel of suitable dimensions, and constructed of any desirable material, and B a valve-casing located below said measuring chamber or vessel, and communicating therewith by means of passages $b$ and $c$. From said valve-casing extend two ports, $d$ and $e$, entering said valve-casing at points opposite the openings of the passages $b$ and $c$, respectively.

The letter D indicates a valve located in said valve-casing, and provided with transverse passages $g$ and $h$, so arranged, relatively to each other and to the passages $b$ $c$ and ports $d\ e$, that when the passage $g$ connects with the passage $b$ and port $d$ the port $h$ will be disconnected from the passage $c$ and port $e$, or vice versa, for the purpose hereinafter explained.

The port $d$ is connected in any convenient manner with a suitable tank, receptacle, or other device for supplying liquid to the tank or vessel A, and the port $e$ leads to a suitable receptacle for the measured liquid, and is preferably provided with a rotating faucet, E, at its lower end, having one or more discharge-spouts of different sizes, the said faucet being adapted to be turned so as to bring either spout into line with the discharge-aperture $k$, in order that the contents of the vessel may be discharged into receptacles having different-sized filling-openings, such as jars, jugs, bottles, and cans, and the said faucet is so arranged that communication between the port $e$ and all of the discharge-spouts may be cut off if desired. The spouts are provided with air-passages in each side to admit of the escape of air from the receptacle while the same is filling.

The letter F indicates a float, consisting, preferably, of a hollow cylinder of metal or other suitable material, located within the vessel or measuring-chamber A, being secured to one end of an arm, G, attached to a rock-shaft, H, passing through a suitably-packed bearing, I, formed at the front of the vessel A, so that said shaft may turn freely therein without permitting the escape of liquid.

The shaft is provided at its outer end with sector K rigidly secured thereto, and graduated as shown, and is also provided with a loosely-mounted index or pointer, L, having a projection, $l$, which is adapted to engage and trip a lever, N, to automatically operate the valve, as more fully hereinafter explained.

The sector is provided with a series of apertures, $l'$, and the pointer with a stud or pin, $m$, which is adapted to fit in said apertures so that the pointer may be secured opposite any of the graduations of the scale, whereby the quantity of liquid to be measured may be regulated, as more fully hereinafter specified.

The letter O indicates the device for registering the number of gallons, or any other given quantities, successively drawn through the apparatus. Said device consists of a rotating dial, pivoted to the front of the apparatus, and provided with a series of arms, curved on each side, as shown at $o$, and beveled at their extremities, as shown at $p$. Said device is operated by means of the pins $s'\ t'$, the pins being located at such relative positions that one will operate on the lower arm of the wheel on the forward movement of the sector, and the other on the upper arm of the dial on its backward movement, so as to give the dial two successive movements in the same direction by the forward and backward movements of the sector.

The lever N, as illustrated in Fig. 1, is fulcrumed loosely on a rock-shaft, P, journaled in a bearing, R, on the valve-casing B. Said rock-shaft carries rigidly a hammer, S, adapted to strike an alarm, T, and a dog or pawl, U, which is tripped to operate the hammer by means of a stud, V, on the valve B, as more fully hereinafter specified. The said lever N is provided at its upper end with a slot, $n'$, and a check pin or stud, $n^2$, projecting through it, and secured to the tank, whereby the movement of said lever is properly limited. The said lever N is provided with a lateral slotted projection, $n^3$, through which passes a pin, A′, hung loosely in the slot by means of a ball, $a'$, so that it may move vertically in its bearings; and it is also provided with a ball, $a^2$, by which it is held in the slot, to limit its movement. Said pin projects through an opening in the valve-chamber B, as shown in Fig. 2, and is adapted to enter a recess, $b'$, to hold the valve in position to admit the fluid to the vessel or tank A, as more fully hereinafter set forth. The valve, in this instance, is of the kind known as a "rotary valve," and has secured to its inner end, which is reduced in size for the purpose, a spiral spring, $d'$, by means of which it automatically changes the connections of the valve.

In the modification shown in Fig. the lever N is dispensed with, and in its place a pawl, B′, is substituted, which is adapted to engage the hammer S′, which is pivoted to a lever, C′, fulcrumed to the front of the vessel or tank A. The hammer is provided with a spring, D′, which bears against the lever, so as to throw said hammer forward when the pawl is tripped by the stud $l$ on the pointer or index, and said hammer is released, causing it to sound the alarm T. The valve in this modification is a slide-valve, and is capable of a longitudinal or reciprocating movement in the valve-chamber, has surrounding it near its forward end a spiral spring, E′, which is held in place so as to bear against the shoulder by means of a cap, F′. The said valve is provided with an annular groove, G′, in which the end of the lever C is adapted to engage, as more fully hereinafter explained.

The operation of my invention is as follows: When it is required to measure a quantity of fluid the pointer or index is first moved so as to be opposite the graduation indicating the desired quantity on the sector. It will be perceived that by moving the pointer from the left to the right on the sector the distance between the projection $l$ and the lever N or pawl B′ is diminished, and that as this distance is diminished, the time at which the projection will act will also diminish, whereby the quantity of liquid to be measured may be varied to any desired extent. The valve is then set until the port $g$ is in line with the pipes $b\ d$ and the port $h$ disconnected with the pipes $c\ e$. This is accomplished by rotating the valve until the recess $b'$ is engaged by the pin $n$, as shown in Fig. 2, or by withdrawing the valve until the annular recess G′ is engaged by the curved lever C', as shown in Fig. 4. The liquid, from a proper receptacle, is then allowed to flow into the tank or vessel A, through the passage $b$, port $d$, and passage $g$, and as it collects it will elevate the float F, carrying the sector K with it. When the proper amount of liquid has collected in the tank or vessel, the float will have moved the sector and the pointer or index a sufficient distance to permit the projection $l$ to trip the mechanism by which the valve is held in a set position, allowing the spiral spring to shift it so as to throw passage $h$ into line with passage-port $c\ e$, and port $g$ out of line with pipes $b\ d$, thus cutting off the inflow of the fluid and permitting the discharge of the same.

What I claim is—

1. The combination, with a measuring-chamber, of a substantially-cylindrical valve-casing connected with said chamber by an inlet and an outlet passage, and provided with additional supply and discharge ports, a valve or plug fitting within said casing, and having transverse passages at right angles to each other, which are adapted to alternately connect the inlet of the measuring-chamber with the supply-port of the valve-casing, and the outlet of said chamber with the discharge-port of the said casing, a float arranged within the measuring-chamber, and connected with a rock-shaft projecting outwardly through the wall thereof, and a lever connecting the outer end of said rock-shaft with the valve or plug, substantially as described, whereby, when the measuring-chamber becomes properly filled with liquid, the float will rise and the valve or plug will be automatically operated to close the inlet and open the outlet and discharge port of the valve-casing, and as the chamber becomes emptied said float will fall and the position of the valve will be automatically reversed.

2. In combination with the float by which the valve is operated, through intermediate mechanism, a sector secured rigidly to the shaft which said float operates, and an adjustable index or pointer secured loosely to said shaft and adapted to be adjusted with respect to the sector in such manner that the projection on the pointer may be caused to trip the lever sooner or later, as desired, whereby the quantity of liquid to be measured may be varied, substantially as specified.

3. In combination, the float, sector, and lever for operating the valve to change its ports, the alarm and mechanism operated by the mechanism for shifting the valve to sound the alarm and indicate when the ports of the valve are changed, substantially as specified.

4. The combination, with the sector secured to the shaft to which the float is attached, of a rotating dial having curved arms, with which two pins on the sector are adapted to engage, one of said pins striking the lower curved arm on the forward movement of the sector, and the other the upward arm on the backward movement of the sector, whereby said dial is moved the extent of one arm at each two movements of the sector to record the quantities of the liquid successively measured, substantially as specified.

5. In combination with the sector and the shaft to which the float is attached, a pointer or index adapted to be adjusted relatively to the float, whereby the lever may be tripped at any desired point to vary the quantity of liquid measured, substantially as specified.

In testimony that I claim the foregoing I have hereunto set my hand in the presence of the subscribing witnesses.

HENRY E. MARCHAND.

Witnesses:
 JAMES L. NORRIS,
 JAMES A. RUTHERFORD.